Oct. 6, 1931.  M. D. AINSLIE  1,825,844
ALIMENT FORMING DEVICE
Filed Dec. 20, 1929
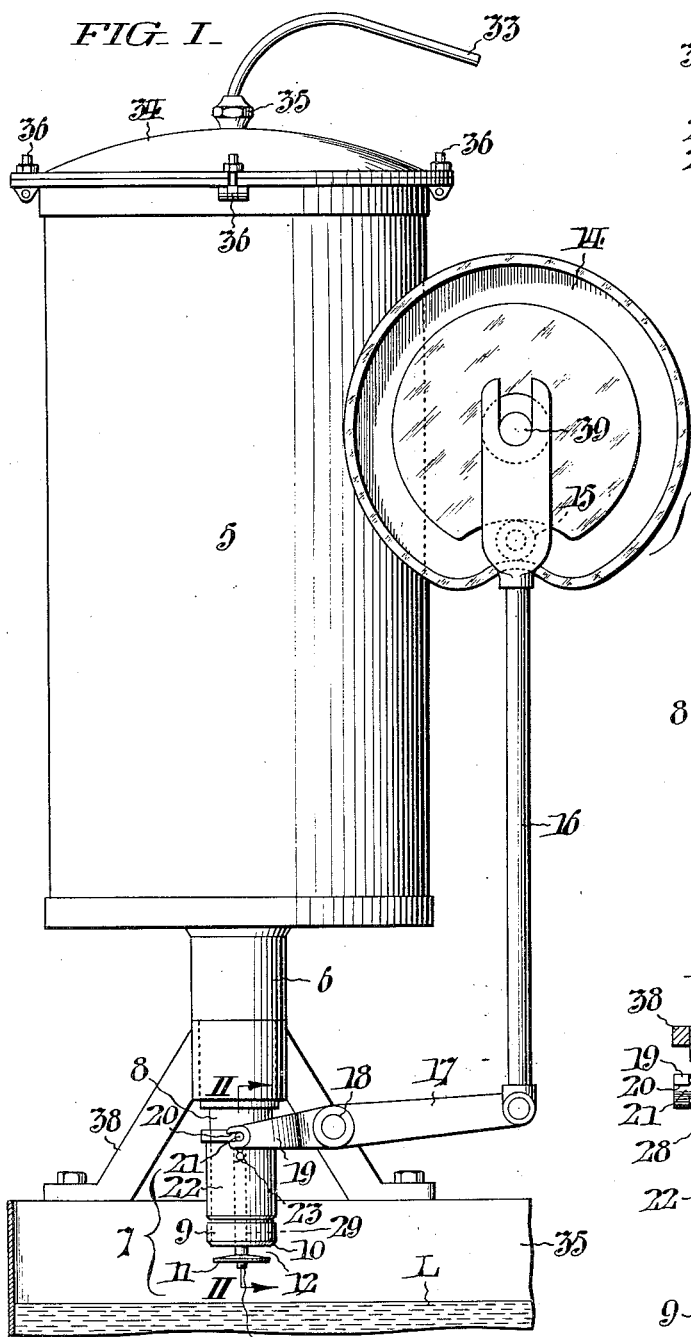
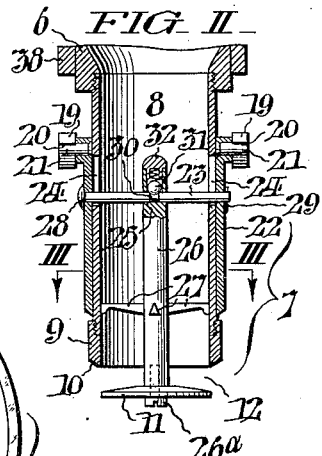
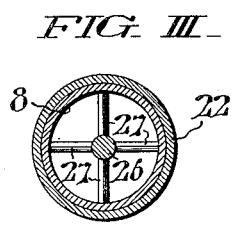
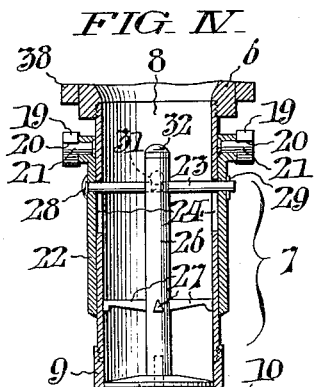
INVENTOR:
Morris D. Ainslie,
BY
ATTORNEYS.

Patented Oct. 6, 1931

1,825,844

UNITED STATES PATENT OFFICE

MORRIS D. AINSLIE, OF BINGHAMTON, NEW YORK, ASSIGNOR TO DOUGHNUT MACHINE CORPORATION, OF NEW YORK, N. Y., A CORPORATION OF NEW YORK

ALIMENT FORMING DEVICE

Application filed December 20, 1929. Serial No. 415,428.

This invention relates to devices for forming alimentary products from dough or other plastic material, particularly doughnuts of annular or ring configuration. More specifically speaking, my invention has reference to alimentary forming devices wherein the dough or plastic is discharged downwardly under pressure from a storage magazine or hopper through a direct communicating tubular bottom outlet with incorporated die mechanism by which the dough is shaped and severed, and the resultant annular formations are released in continuous succession.

In connection with aliment forming devices of the kind specifically referred to, I aim to enable, through provision of simple and reliable means for the purpose, actuation of the die mechanism without entailing the use of operating connections up through the dough magazine, and without restricting or interfering with the flow of the dough through the hopper outlet.

Other objects and attendant advantages of this invention will be manifest from the following description considered in connection with the attached drawings, wherein Fig. I is a fragmentary view in side elevation of my improved aliment forming device.

Fig. II is a detail cross sectional view, taken as indicated by the arrows II—II in Fig. I and drawn to a larger scale, showing the details of the die mechanism with the latter in open position.

Fig. III is a cross sectional view taken as indicated by the arrows III—III in Fig. II; and, Fig. IV is a view similar to Fig. II with the die mechanism closed.

As herein depicted, the eliment forming device of my invention comprises a magazine or hopper 5 for dough or plastic material, the same being in the present instance cylindric and discharging through a direct communicating tubular outlet 6 at its bottom. As shown, the outlet 6 is fitted with a die mechanism 7 comprising a tubular member 8 which is screwed into said outlet so as to constitute an axial prolongation thereof. This outlet extension 8 is threaded at its lower end for attachment of a replaceable mouth piece 9 whereof the bottom edge is beveled as at 10, for capacity to operate as a shearing element in conjunction with a cutter disk 11, as will be more fully explained presently. The cutter disk 11 normally occupies a plane below the bottom edge of the mouth piece 9, as shown in Figs. I and II, with incident formation of an annular die opening at 12 through which the dough is extruded from the hopper 5 under pressure.

Periodically, the cutter disk 11 is moved up into the mouth piece 9 of the tubular outlet extension 8 as shown in Fig. IV, to sever the extrusions of the dough. The means for reciprocating the cutter disk 11 for the indicated purpose includes a rotary cam 13 (Fig. I) having a side face groove 14 which is engaged by a roller 15 on a thrust link 16. At its free end, this thrust link 16 is pivotally coordinated with a yoke lever 17 which is fulcrumed to rock on a fixed center 18. The bifurcate extremities 19 of the yoke lever 17 are clevised, as shown at 20 in Figs. I, II and IV, to engage studs 21 that project laterally from a sliding sleeve 22 surrounding the tubular outlet extension 8. Movement is communicated from the sleeve 22 to the cutter disk 11 through the medium of a diametral cross pin 23 that traverses longitudinal guide slots 24 at opposite sides of the outlet extension 8 and engages a transverse aperture 25 adjacent the top end of an upward axial stem 26 whereto the cutter disk 11 is removably secured by a screw 26a. In this connection, it is to be noted that the sleeve 22 also functions as a sealing means to prevent leakage of dough through the guide slots 24 for the cross pin 23. At a level intermediate the cross pin 23, the stem 26 carries a number of radially projecting fingers 27 which reach into contact with the inner surface of the tubular outlet extension 8 to maintain the cutter disk 11 accurately centralized incident to reciprocation, said fingers being made very narrow in plan, see Fig. III, so as to offer a minimum of resistance to downward flow of the dough through the outlet. As shown in Figs. II and IV, the cross pin 23 has a head 28 at one end, and is retained against dislodgment in the assemblage by a cotter key 29 engaging an aperture in its opposite end. The cross pin 23 moreover is circumferentially recessed at its center, as shown at 30, for engagement of a spring pressed ball 31 retained by a removable screw cap 32 in a hollow at the top of the stem 26. This provision insures proper centralization of the upper end of the stem 26 within the outlet prolongation 8 and yet permits ready withdrawal of the pin 23 and removal of the cutter disk 11 for the purposes of inspection and cleaning from time to time. It will moreover be seen that the arrangement, in addition to being simple and reliable in operation, is unique in that it obviates die actuating connections up through the dough hopper 5. A further advantageous feature of my invention resides in the fact that it is possible to replace the mouth piece 9 and the cutter disk 11 by others of larger or smaller diameters than shown in predetermining formation by the device of correspondingly larger or smaller rings of dough without necessitating any other replacements or alterations in the structure as a whole.

As a means for maintaining the dough under pressure to facilitate its discharge through the outlet 6 of the hopper 5, I prefer to employ compressed air which may be supplied from any suitable source through a flexible tube 33 connecting with the cover 34 of the hopper 5 at 35, said cover being clamped fluid tight, with capacity however for ready removal to permit filling of the hopper 5, by a number of swing bolts 36. When used with cooking apparatus, the forming device is preferably positioned as shown in Fig. I, with the die mechanism 7 in close proximity to the liquor L in the cooking receptacle 37 so as to prevent deformation of the dough rings which are periodically released by said die mechanism as previously explained. In the illustrated instance, the device is afforded support by a bracket 38 which engages the hopper outlet 6, and which, moreover, carries the fixed center 18 whereon the yoke lever 17 is fulcrumed. Obviously the shaft 39 carrying the cam 13 may be driven either manually or by power.

Having thus described my invention, I claim:

1. An aliment forming device comprising a dough hopper having a tubular discharge outlet at the bottom; a co-axial cutter disk with a stem extending up into the outlet; a removable cross pin engaging an aperture adjacent the top of the stem and extending through diametrically opposite longitudinal guide slots in the discharge outlet, yielding means for insuring engagement of the stem centrally of the cross pin; and means for reciprocating the cross pin in its guide slot to effect actuation of the cutter disk.

2. An aliment forming device comprising a dough hopper having a tubular discharge outlet at the bottom; a co-axial cutter disk with a stem extending up into the outlet; a removable cross pin engaging an aperture adjacent the top of the stem and extending through diametrically opposite longitudinal guide slots in the discharge outlet; a spring pressed ball cooperating with a recess in the stem for insuring engagement of the latter centrally of said cross pin; and means for reciprocating the cross pin in its guide slots to effect actuation of the cutter disk.

In testimony whereof, I have hereunto signed my name at New York, New York, this 13th day of December, 1929.

MORRIS D. AINSLIE.